United States Patent [19]
Bonnin

[11] Patent Number: 6,042,731
[45] Date of Patent: Mar. 28, 2000

[54] METHOD OF REMOVING ARSENIC SPECIES FROM AN AQUEOUS MEDIUM USING MODIFIED ZEOLITE MINERALS

[75] Inventor: Dagmar Bonnin, Tampa, Fla.

[73] Assignee: The University of South Florida, Tampa, Fla.

[21] Appl. No.: 09/016,126

[22] Filed: Jan. 30, 1998

Related U.S. Application Data

[60] Provisional application No. 60/036,704, Jan. 31, 1997.

[51] Int. Cl.$^7$ ................ B01D 15/00; C02F 1/28

[52] U.S. Cl. .................. 210/679; 210/683; 210/911

[58] Field of Search ................... 210/679, 683, 210/684, 911

[56] References Cited

U.S. PATENT DOCUMENTS

| | | | |
|---|---|---|---|
| 5,547,585 | 8/1996 | Shepherd et al. | 210/679 |
| 5,591,346 | 1/1997 | Etzel et al. | 210/683 |
| 5,622,632 | 4/1997 | Gallup | 210/669 |

*Primary Examiner*—Ivars Cintins
*Attorney, Agent, or Firm*—Kohn & Associates

[57] ABSTRACT

A method for removing arsenic species from an aqueous medium with modified zeolite minerals comprising providing an aqueous medium containing arsenic species in the form of both arsenate and arsenite, contacting the aqueous medium with an iron (II) laden zeolite mineral so that arsenic in the form of at least one of arsenate and arsenite contained in the aqueous medium can be adsorbed onto the iron (II) laden zeolite mineral forming an arsenic adsorbed iron (II) laden zeolite mineral, and separating the arsenic adsorbed iron (II) laden zeolite mineral from the aqueous medium.

20 Claims, No Drawings

METHOD OF REMOVING ARSENIC SPECIES FROM AN AQUEOUS MEDIUM USING MODIFIED ZEOLITE MINERALS

CROSS-REFERENCE TO RELATED APPLICATIONS

This application claims the benefit of U.S. Provisional Application No. 60/036,704, filed on Jan. 31, 1997, the disclosure of which is hereby incorporated by reference herein.

BACKGROUND OF THE INVENTION

1. Field of the Invention

This invention relates to modifying zeolite minerals in order to increase their affinity for arsenic species, and their use in removing arsenic species from an aqueous medium.

2. Description of the Background Art

Arsenic is a shiny, gray, brittle element possessing both metallic and non-metallic properties. It is stable in its elemental form, but is most commonly found in the trivalent form (Arsenite) and pentavalent form (Arsenate). Its compounds may be organic or inorganic. The dominant forms of arsenic present in natural waters at common pH (6–8) are the monovalent $H_2AsO_4^-$ and the divalent $HAsO^{2-}$ forms of arsenate and the uncharged form of arsenite, arsenious acid $HAsO_2$.

Inorganic arsenic is highly toxic to mammals and aquatic species. When ingested, it is readily absorbed from the gastrointestinal tract, the lungs, and to a lesser extent from the skin, and becomes distributed throughout the body. Trivalent inorganic forms of arsenic are more toxic than the pentavalent forms. Recently, arsenic in water supplies has been linked to arsenical dermatosis and skin cancer.

Naturally occurring ubiquitous arsenic is present in the environment and makes of 0.00005% of the earth's crust. Hence it is found in trace quantities in many ground and surface waters. However, arsenic has many industrial uses such as hardening of copper and lead alloys, pigmentation in paints and fireworks, and the manufacture of glass, cloth, and electrical semiconductors. Arsenic is also used extensively in the production of agricultural pesticides, which includes herbicides, insecticides, desiccants, wood preservatives and feed additives. Runoff from these uses and the leaching of arsenic from waste generated from these uses have resulted in increased levels of various forms of soluble arsenic in water. Because of recent studies further revealing its toxicity, the United States Environmental Protection Agency (EPA) has classified arsenic as a human carcinogen (Group A) and is considering lowering its maximum contaminant level from its present requirement 50 parts per billion (ppb) to 5 ppb or less.

In order to keep the water supply safe for human consumption, and affordable to all, water utilities are presently examining methods of treating water in order to reduce levels of arsenic in the water to 5 ppb. One such method is adsorption, which is the bonding of an aqueous species to the surface of a solid grain. The solid grain is called the sorbent while the aqueous species is called the sorbate. The nature of the sorbent, including functional groups and the surface area available for adsorption, affects the affinity of the sorbent for specific contaminants. Also, the chemical character, shape, and configuration of the sorbate, its water solubility, its acidity, the polarity of the molecule, its molecular size and polarizability all affect its ability to sorb onto the reactive media.

One method for removing arsenic species from an aqueous medium is through the use of an alumina sorbent. U.S. Pat. No. 5,556,545 (Konstantin, et al.), which is incorporated by reference herein, discloses the use of activated alumina sorbent having a particulate size below 200 micrometers diameter and with sufficient porosity and pore diameters above 100 Angstroms to remove arsenic from water. This method is done using a slurry of the activated alumina sorbent and water. After a certain period of time, the activated alumina sorbent is removed and the water is recovered. The spent activated alumina sorbent is then regenerated and recycled.

However, the use of activated alumina as sorbent contains some inherent limitations. For example, in order to make the removal of arsenic with activated alumina sorbent an economically feasible process, rejuvenation and conditioning of the sorbent for subsequent use is necessary. Rejuvenation and conditioning of the sorbent is a process wherein the sorbent is made to release its adsorbed arsenic. Therefore, this rejuvenation process creates a hazardous solution which requires further treatment and ultimately expensive disposal costs.

Another limitation connected with the use of activated alumina as a sorbent to remove arsenic species from water involves the regeneration of the sorbent. More specifically, some sorbent is lost in every regeneration due to the strong alkaline solution necessary to remove the adsorbed arsenic. Hence, lost activated alumina sorbent must continuously be replaced which substantially increases the cost of using activated alumina as a method for removing arsenic from an aqueous medium.

Another method for removing arsenic species from an aqueous medium is through the use of activated carbon. Activated carbon is available in powdered (PAC) and granular (GAC) forms. The powdered form is generally utilized in a batch process, most often in conjunction with another unit process. Studies have shown that the addition of a powdered activated carbon to a lime softening process can enhance arsenic removal (Dutta, A. and M. Chaudhuri. "Removal of arsenic from groundwater by lime softening with powdered coal additive." *Aqua*, vol. 40, no. 1 (1991) pp. 25–29). Lime softening and PAC alone were found to remove 90% and 15%, respectively of the aqueous arsenic species present.

However, the use of activated carbon to remove arsenic species from an aqueous medium has inherent limitations in that activated carbon has a limited natural capacity for adsorbing arsenic species. Further, activated carbon has a high cost making it less attractive as a chosen method for removing arsenic species from an aqueous medium.

Yet another method for removing arsenic species from an aqueous medium is through the use of fly ash. Fly ash is a waste product produced in large quantities at coal power stations. It is composed primarily of calcium oxide, CaO, but also may contain magnesium, aluminum and iron oxides.

However, the properties of fly ash produced by a particular power station are dependent upon the fuel used at that power station. Hence, quality control and the fly ash's capacity for arsenic species are difficult to maintain. Moreover, fly ash is produced only in a powdered form, and therefore has limited application in column separation.

Still another presently known method to remove arsenic species from an aqueous medium is ion exchange. Ion exchange is essentially a sorption process. Arsenic anions enter the exchanger structure and replace labile anions. One of the disadvantages of this process is that the ion-exchangers utilized are mostly synthetic resins and hence are expensive. Further, few arsenic selective resins presently exist. Consequently, ubiquitous anions such as sulfates compete for the ion-exchange sites in the resin. Chromatographic peaking of toxic arsenic levels can occur in this situation.

In general, ion-exchange is not a feasible method of removing arsenic from an aqueous medium if the medium contains a high level of dissolved solids or sulfate concentrations. Ion exchange resins are generally regenerated with a sodium chloride solution. As is the case with activated alumina, the spent regenerant will require treatment prior to reuse or disposal.

Another method for removing arsenic species from an aqueous medium is through the use of a membrane process. A membrane process involves passing the aqueous medium through the membrane to filter the selected material. For example, reverse osmosis has been shown to reject arsenic in commercial and household (point of use treatment) applications (please see Connell, P. J. and T. A. Marr. "Emergency response spill cleanup of wood treating waste." *Water Pollution Research Journal of Canada*, vol. 25, no. 3 (1990), pp. 265–273; Fox, Kim R. and Thomas L. Song. "Controlling arsenic, fluoride and uranium by point-of-use treatment." *Journal of the American Water Works Association* (1987); Fox, Kim R. "Field experience with point-of-use treatment systems for arsenic removal." *Journal of the American Water Works Association*, vol. 81, no. 2 (1989), pp. 94–101; Rozelle, Lee T. "Point-of-use and point-of-entry drinking water treatment." *Journal of the American Water Works Association* (1987); Stass, A. A. "Osmose water purification system to remove CCA contaminants from water." *Arsenic and mercury workshop on removal, recovery, treatment, and disposal*, EPA/600/R-92/105. U.S.E.P.A., Cincinnati, (1992), pp. 30–32). Discharge levels of 0.05 mg/l have been met.

However, membrane processes are similar to the ion exchange process described herein due to the fact that they both require treatment of the concentrated waste stream (reject) in order to dispose of the arsenic contaminant. Therefore, membrane processes are costly as a method for removing arsenic species from an aqueous medium.

The present invention employs modified zeolite minerals as a method for removing arsenic species from an aqueous medium. Zeolite minerals are inexpensive minerals composed of crystalline hydrated aluminosilicates of group I and II metals in the periodic table. The isomorphous substitution of aluminum ions for silica ions into the component polyhedra causes a residual charge on the oxygen framework. Zeolites have a generally open framework which contain channels that can accommodate water molecules, and the cations necessary for charge balancing.

As stated hereinabove, zeolite minerals are very inexpensive compared to synthetic resins, and are readily available. Hence it is not economically necessary to remove adsorbed arsenic from them and reuse them. Further, the present invention for a method of removing arsenic species from an aqueous medium using modified zeolite minerals can remove arsenic from an aqueous medium to 50 ppb or less within about 2 hours of treatment.

Hence, one object of the present invention is to modify naturally occurring zeolite minerals with a concentrated ferrous aqueous solution in order to increase the zeolite mineral's affinity for aqueous arsenic species in an aqueous medium.

Therefore, the primary object of the present invention is to provide a method of removing arsenic species in the form of both arsenate and arsenite from an aqueous medium with modified zeolite minerals that does not possess the shortcomings of the prior art and offers the advantages of being able to achieve the removal of arsenic in the form of both arsenate and arsenite and is less expensive to use than the methods disclosed in the prior art.

Another object of the present invention is provide a method of removing aqueous arsenic species from an aqueous medium to a detection level for arsenic species of 5 ppb.

Yet another object of the present invention is to provide an inexpensive sorbent material to remove aqueous arsenic species from an aqueous medium which does not need to be reused in order to be economically applicable.

Yet still another object of the present invention is to provide an inexpensive sorbent material to remove aqueous arsenic species from an aqueous medium which will not leach aqueous arsenic species and can be readily disposed of as non-hazardous waste.

Another object of the present invention is provide a method of removing aqueous arsenic species from natural water.

Yet another object of the present invention is provide a method of removing aqueous arsenic species from natural water having a pH range from 5 to 8.

A further object is to provide a method of removing arsenic species from an aqueous medium using modified zeolite minerals comprising: providing an aqueous medium containing arsenic species in the form of both arsenate and arsenite; contacting the aqueous medium with an iron (II) laden zeolite mineral so that arsenic in the form of both arsenate and arsenite contained in the aqueous medium can be adsorbed onto the iron (II) laden zeolite mineral forming an arsenic adsorbed iron (II) laden zeolite mineral; and separating the arsenic adsorbed iron (II) laden zeolite mineral from the aqueous medium.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims.

SUMMARY OF THE INVENTION

The present invention is defined by the appended claims with the specific embodiment shown in the attached drawings. This invention satisfies the need for an inexpensive and safe method for removing arsenic species from an aqueous medium to be compliance with federal safety standards.

For the purpose of summarizing this invention, this invention comprises providing an aqueous medium containing arsenic species in the form of at least one of arsenate and arsenite whereby the aqueous medium is brought in contact with an iron (II) laden zeolite mineral. The iron (II) laden zeolite mineral adsorbs the arsenic species contained in the aqueous medium. The iron (II) laden zeolite mineral is then separated from the aqueous medium upon saturation level of the arsenic species through adsorption onto the iron (II) laden zeolite mineral.

The modification of zeolite minerals involves exposing them to concentrated ferrous aqueous solutions so that ferrous ions in the concentrated ferrous aqueous solution are absorbed onto the zeolite mineral to form an iron (II) laden zeolite mineral. Based upon research conducted by applicant and reported herein, this modification of the zeolite mineral increases its affinity for arsenic so that it can be used efficiently to remove the level of arsenic species in an aqueous solution to a level of 5 ppb.

Therefore, it can be readily seen that the present invention provides a method of removing arsenic species from an aqueous medium using modified zeolite minerals that can cost effectively and safely remove arsenic from an aqueous medium. Thus, a method of removing arsenic species from an aqueous medium using modified zeolite minerals provides capabilities that would be appreciated.

The foregoing has outlined rather broadly, the more pertinent and important features of the present invention. The detailed description of the invention that follows is offered so that the present contribution to the art can be more fully appreciated. Additional features of the invention will be described hereinafter. It should be appreciated by those skilled in the art that the conception and the disclosed specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DESCRIPTION OF THE PREFERRED EMBODIMENTS

Chabazite was the zeolite mineral used as the starting material in the preferred embodiment of the present invention. However, it may be possible that any presently known or subsequently discovered zeolite mineral can be used as the starting material.

In the preferred embodiment, the chabazite starting material, marketed by GSA Resources as ZC400H, had a particle size of 20×60 U.S. mesh. The chabazite was washed by mixing it with distilled/de-ionized (DI) water. The chabazite was allowed to settle and the DI water decanted off. This procedure was repeated five (5) times. The chabazite was then placed in a ceramic crucible and dried in an oven at 103° C. for approximately two (2) hours.

Subsequently, 10 g of the dried chabazite was removed and mixed with a 1 L solution of 0.2 M $FeSO_4$ and exposed in a mixer for twenty-four (24) hours to form iron (II) laden chabazite.

After 24 hours of contact with the 0.2 M $FeSO_4$ aqueous solution in the mixer, the iron (II) laden chabazite/$FeSO_4$ mixture was filtered to separate the iron (II) laden chabazite solid phase from the liquid phase. The solid phase of the iron (II) laden chabazite/$FeSO_4$ mixture was retained, whereas, the liquid phase the iron (II) laden chabazite/$FeSO_4$ mixture was discarded.

The iron (II) laden chabazite solid was transferred to the contacting jar in the mixer and rinsed with DI water. The rinsing cycle was repeated five times. The iron (II) laden chabazite was then dried in an oven at 103° C.

A. Determination of the Ability of the Iron (II) Laden Chabazite to Remove Arsenate from an Aqueous Medium After drying, the iron (II) laden chabazite was tested with an aqueous solution containing arsenic species to determine its affinity for arsenate relative to the arsenate affinity of unmodified chabazite. In this test, twelve 150 ml aliquots of 5 mg/l of As (V) were pipetted into individual 250 ml NALGENE® bottles. Iron (II) laden chabazite was added to the bottles in doses ranging from 0 to 500 mg. One bottle was kept as a control (no sorbent added). The bottles were then capped and placed on a constant temperature water bath/shaker operating at 1405 cm excursions/min and a temperature of 25° C.

After shaking for twenty-four (24) hours, the bottles were removed from the water bath, the pH of each bottle was measured on a FISHER SCIENTIFIC® pH meter. A 35 ml sample was then removed from each bottle and individually filtered through a 0.45 µm filter. The filtrates were then analyzed for arsenic with the Standard Method 3500-As C. Silver Diethyldithiocarbamate method, which has been approved by the EPA. The different concentrations of iron (II) laden chabazite examined here were tested in duplicates. All samples were analyzed for arsenic concentration, pH, and the results were recorded. The same procedures were used with untreated chabazite as a control. The iron (II) laden chabazite made pursuant to the present invention has a much greater capacity for arsenate in an aqueous solution than does untreated chabazite.

Moreover, applicant had a Toxicity Characteristic Leaching Procedure (TCLP) test conducted on a sample of arsenic loaded iron (II) laden zeolite mineral from the top portion of a column containing iron (II) laden zeolite mineral used to treat drinking water. This test is designed to determine whether arsenic loaded iron (II) laden zeolite mineral would leach arsenic species if disposed of in a non-hazardous waste landfill. The protocol for TCLP is promulgated by the EPA and is published in the Federal Register at 55 FR 26986.

Applicant had the above referenced TLCP test performed on some arsenic loaded iron (II) laden zeolite mineral produced pursuant to the present invention. According to the results of this test, arsenic was not detected in any of the leachate from the arsenic loaded iron (II) laden zeolite mineral. The detection limit for arsenic was 5 µg/L. A scanning electron microscopy (SEM) analysis of the sorbent indicated an arsenic concentration of 13 mg/gram.

The ability of the iron (II) laden chabazite to remove arsenate was also evaluated in a fixed bed application. In particular, the dried chabazite was loaded into two clear PVC columns which were connected in series. The sorbent bed depth of the column was 25 inches, and the diameter was two inches. A concentrated ferrous solution was then run through the column in order to convert the dried chabazite into iron (II) laden chabazite. A 1 mg/L arsenate solution was then prepared by spiking potable water with arsenic acid, $Na_2HAsO_4$. The solution was fed in the columns containing the iron (II) laden chabazite at a rate of 3.65 gpm/$ft^2$.

Samples of the effluents from both columns were taken and sent to Quanterra Environmental Services, a laboratory certified by the Florida Department of Environmental Protection having a principal place of business at 5910 Breckenridge Parkway, Suite H, Tampa, Fla. 33610. Quanterra used Method SW846 6010A (Trace Inductively Coupled Plasma) to assay the column effluent for arsenate. This assay has an arsenate detection limit of 5 µg/L (0.005 mg/L).

According to the results of this assay, over 235 bed volumes of the arsenate spiked potable water were treated with the iron (II) laden chabazite before arsenate was detected in the effluent.

B. Determination of the Application of Iron (II) Laden Chabazite to Remove Arsenite from an Aqueous Medium in a Batch Equilibrium Study In the batch equilibrium studies, different quantities of iron (II) laden chabazite were placed in individual 250 ml NALGENE® bottles and exposed to identical volumes of a 5 mg/L arsenite solution prepared by dissolving $NaAsO_2$ in DI water deoxygenated with $Na_2SO_3$. The iron (II) laden chabazite was allowed to equilibrate with the arsenite solution in the individual bottles for 24 hours at 25° C. in a constant temperature water bath shaker.

After shaking for 24 hours, the pH of the mixture in each bottle was measured on a FISHER SCIENTIFIC® pH meter. A 35 ml sample was then removed from each bottle and individually filtered through a 0.45 μm filter. The individual filtrates from the samples were then analyzed for arsenic with the Standard Method 3500-As C. Silver Diethyldithiocarbamate method, which has been approved by the EPA. The different concentrations of iron (II) laden chabazite examined here were tested in duplicates. The sample filtrates were also analyzed for pH, and dissolved oxygen (DO) content, and the results of these assays were recorded. This procedure was repeated using untreated chabazite sorbent. The iron (II) laden chabazite made pursuant to the present invention have a much greater capacity for arsenite in an aqueous solution than does untreated chabazite.

In addition, an equilibrium study was run utilizing a powdered form of iron (II) laden chabazite. The results of this equilibrium study indicate that this powder form exhibited an even higher capacity for arsenite than did iron (II) laden chabazite in granular form.

Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

What is claimed is:

1. A method for removing arsenate and arsenite from an aqueous medium by the steps consisting of:

providing an aqueous medium containing arsenate and arsenite;

contacting the aqueous medium with an iron (II) laden zeolite mineral so that arsenate and arsenite contained in the aqueous medium are adsorbed onto the iron (II) laden zeolite mineral forming an arsenic adsorbed iron (II) laden zeolite mineral; and separating the arsenic adsorbed iron (II) laden zeolite mineral from the aqueous medium.

2. The method for removing arsenic species in the form of both arsenate and arsenite from an aqueous medium, as described in claim 1, wherein said arsenic species are effectively removed from said aqueous medium to achieve an arsenic level of five parts per billion and below.

3. The method for removing arsenic species in the form of both arsenate and arsenite from an aqueous medium, as described in claim 1, wherein said iron (II) laden zeolite is formed by:

mixing a zeolite mineral with a concentrated ferrous aqueous solution so that $Fe^{2+}$ ions in the concentrated ferrous aqueous solution are adsorbed onto the zeolite mineral to form iron (II) laden zeolite mineral; and separating the iron (II) laden zeolite mineral from the concentrated ferrous aqueous solution.

4. The method for removing arsenic species in the form of both arsenate and arsenite from an aqueous medium, as described in claim 3, wherein said arsenic species are effectively removed from said aqueous medium to achieve an arsenic level of five parts per billion and below.

5. The method for removing arsenic species in the form of both arsenate and arsenite from an aqueous medium, as described in claim 3, wherein the zeolite mineral is selected from the group consisting of clinoptilolite and chabazite and mixtures thereof.

6. The method for removing arsenic species in the form of both arsenate and arsenite from an aqueous medium, as described in claim 5, wherein said arsenic species are effectively removed from said aqueous medium to achieve an arsenic level of five parts per billion and below.

7. The method for removing arsenic species in the form of both arsenate and arsenite from an aqueous medium, as described in claim 5, wherein the concentrated ferrous aqueous solution is a 0.2 M $FeSO_4$ aqueous solution.

8. The method for removing arsenic species in the form of both arsenate and arsenite from an aqueous medium, as described in claim 7, wherein said arsenic species are effectively removed from said aqueous medium to achieve an arsenic level of five parts per billion and below.

9. The method for removing arsenic species in the form of both arsenate and arsenite from an aqueous medium, as described in claim 1, wherein said aqueous medium is natural water.

10. The method for removing arsenic species in the form of both arsenate and arsenite from an aqueous medium, as described in claim 9, wherein said arsenic species are effectively removed from said aqueous medium to achieve an arsenic level of five parts per billion and below.

11. The method for removing arsenic species in the form of both arsenate and arsenite from an aqueous medium, as described in claim 9, wherein said iron (II) laden zeolite is formed by:

mixing a zeolite mineral with a concentrated ferrous aqueous solution so that $Fe^{2+}$ ions in the concentrated ferrous aqueous solution are adsorbed onto the zeolite mineral to form iron (II) laden zeolite mineral; and separating the iron (II) laden zeolite mineral from the concentrated ferrous aqueous solution.

12. The method for removing arsenic species in the form of both arsenate and arsenite from an aqueous medium, as described in claim 11, wherein said arsenic species are effectively removed from said aqueous medium to achieve an arsenic level of five parts per billion and below.

13. The method for removing arsenic species in the form of both arsenate and arsenite from an aqueous medium, as described in claim 11, wherein the zeolite mineral is selected from the group consisting of clinoptilolite and chabazite and mixtures thereof.

14. The method for removing arsenic species in the form of both arsenate and arsenite from an aqueous medium, as described in claim 13, wherein said arsenic species are effectively removed from said aqueous medium to achieve an arsenic level of five parts per billion and below.

15. The method for removing arsenic species in the form of both arsenate and arsenite from an aqueous medium, as described in claim 13, wherein the concentrated ferrous aqueous solution is a 0.2 M $FeSO_4$ aqueous solution.

16. The method for removing arsenic species in the form of both arsenate and arsenite from an aqueous medium, as described in claim 15, wherein said arsenic species are effectively removed from said aqueous medium to achieve an arsenic level of five parts per billion and below.

17. The method for removing arsenic species in the form of both arsenate and arsenite from an aqueous medium, as described in claim 15, said aqueous medium further having a pH ranging from 5 to 8.

18. The method for removing arsenic species in the form of both arsenate and arsenite from an aqueous medium, as described in claim 17, wherein said arsenic species are effectively removed from said aqueous medium to achieve an arsenic level of five parts per billion and below.

19. The method for removing arsenic species in the form of both arsenate and arsenite from an aqueous medium, as described in claim 1, said aqueous medium further having a pH ranging from 5 to 8.

20. The method for removing arsenic species in the form of both arsenate and arsenite from an aqueous medium, as described in claim 19, wherein said arsenic species are effectively removed from said aqueous medium to achieve an arsenic level of five parts per billion and below.

* * * * *